July 18, 1950
T. R. GARDINER
2,515,705
TRAILER SUPPORTING VEHICLE
Filed March 18, 1947
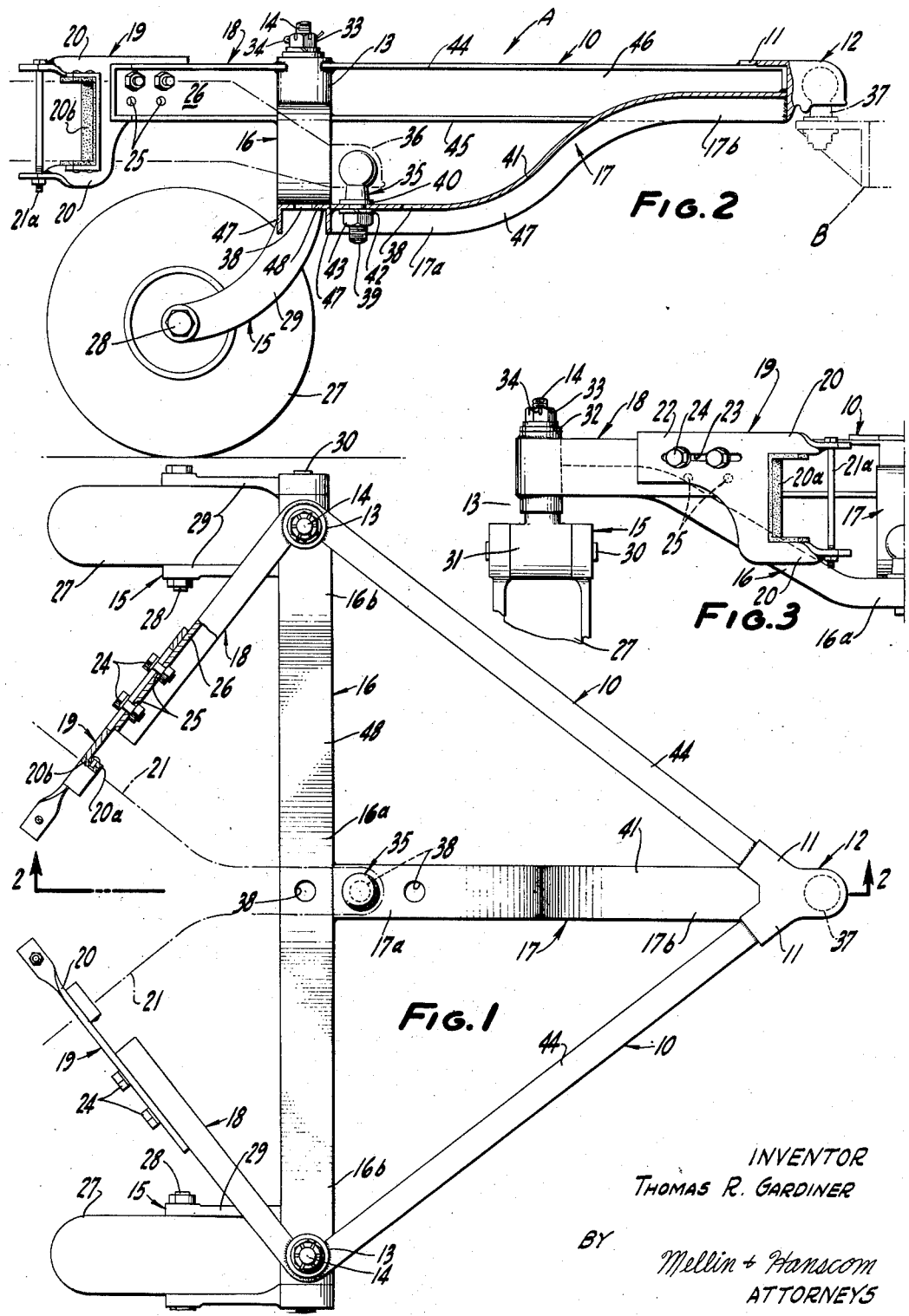
INVENTOR
THOMAS R. GARDINER
BY
Mellin + Hanscom
ATTORNEYS Patented July 18, 1950

2,515,705

UNITED STATES PATENT OFFICE 2,515,705

TRAILER SUPPORTING VEHICLE

Thomas R. Gardiner, Piedmont, Calif.

Application March 18, 1947, Serial No. 735,347

7 Claims. (Cl. 280—33.4)

The present invention relates to vehicles for supporting part of the load of a trailer, and is more particularly directed to a trailer supporting vehicle adapted to be positioned between the trailer and an automobile or similar source of pulling power.

It is usual practice to tow a trailer by pivotally coupling, or hitching, its forward frame portion directly to the rear of an automobile, or like vehicle. The automobile is, accordingly, subjected to and must carry a substantial portion of the trailer load, which may result in overloading the rear of the automobile. In addition, the point on the automobile at which the trailer can be hitched to it is ordinarily so located as to result in the trailer's occupying an inclined position to the road, rather than a parallel position thereto, while coupled to the automobile.

It is an object of the present invention to provide an improved vehicle capable of being coupled to an automobile and trailer, which is adapted to support the forward portion of the trailer and relieve at least a major portion of its load from the automobile.

Another object of the invention is to provide a vehicle adapted to be positioned between and coupled to an automobile and trailer, whose coupling with the trailer is variable to enable alterations in the proportions of the trailer load carried by the vehicle and automobile.

A further object of the invention is to provide a vehicle adapted to be coupled to an automobile and trailer, which vehicle is capable of supporting the trailer parallel to the road.

Still another object of the invention is to provide a trailer supporting vehicle capable of being coupled to an automobile and having a frame attachable to the trailer frame in such manner as to cause the frame to function substantially as a unitary structure.

Yet a further object of the invention is to provide a trailer supporting vehicle for coupling to an automobile, which is comparatively simple, sturdy and economical to produce.

One form which the invention may assume is exemplified in the following description and illustrated by way of example in the accompanying drawings, in which:

Fig. 1 is a top plan view of the trailer supporting vehicle, parts being broken away to show certain details.

Fig. 2 is a longitudinal section taken generally along the line 2—2 on Fig. 1.

Fig. 3 is a partial rear elevation of the trailer supporting vehicle.

In the form of the invention disclosed in the drawings, a vehicle A is adapted to be coupled to the rear of an automobile B, and also to the forward portion of a trailer C.

The vehicle A includes a frame having forward, generally horizontal, diagonal side members 10 converging toward each other forwardly of the vehicle, and with their front ends welded, or otherwise suitably secured, to the arms 11 of a socket portion 12 of a tailer hitch. The rear ends of the forward members are welded to vertical bearing supports 13, through which extend the spindles 14 of caster wheel mountings 15. A transverse member, or crossbeam 16, extends between and is welded to the bearing members 13, this beam, in turn, being braced by welding its medial portion 16a to a central longitudinal member 17, whose forward end is welded to the arms 11 of the hitch, and also, if desired, to the diagonal members 10 themselves.

Rear diagonal members 18 have their forward ends welded to the vertical bearing supports or bosses 13, and converge toward each other rearwardly of the vehicle. These members are each provided with an adjustable clamp or fork 19 having upper and lower jaws 20. A generally U-shaped metallic strip 20a is welded to the jaw portions of each clamp, to which a brake lining 20b is riveted for engagement with the upper and lower surfaces of the trailer side frame 21. The outer ends of the jaws are twisted through 90 degrees to receive bolts 21a disposed on the inside of the frame 21 to assist in securing the trailer frame 21 to the rear members 18. The web 22 of the fork is provided with a longitudinal slot 23 through which bolts 24 may extend through either an upper or lower row of holes 25 in the web 26 of the rear diagonal frame member 18, in order that the fork 19 may be adjusted both laterally and vertically with respect to the rear members 18.

The frame is supported for rolling along the ground, for which purpose a pair of side wheels 27 is provided, each wheel being rotatable upon an axle 28 secured to and between the side arms 29 of a caster wheel mounting, pivotally mounted upon a hinge pin 30 extending through a suitable horizontal bearing support 31 integral with and perpendicular to the vertical spindle 14 extending through the frame bearing 13. The caster wheel mounting 15 may support the load resiliently through a suitable spring arrangement (not shown) associated with its arms 29, bearing 31 and spindle 14. One such form of caster wheel mounting is shown and described in my application for "Caster Wheel Mounting for Land Vehicles and Aircraft," Serial No. 698,640, filed September 23, 1946, to which attention is invited for further details.

The caster wheel mounting 15 is movable about the vertical spindle axis within the bearing 13, and the mounting is held assembled in such bearing in any suitable manner, as, for example, by means of a washer 32 engaging the upper end of the bearing and a castellated nut 33 threaded on the spindle 14 and engaging the washer. Inadvertent removal of the nut 33 from the spindle 14 may be prevented by a cotter pin 34 extending between the nut castellations and through the spindle.

In order to lower the point of attachment between the frame 21 of the trailer C and the frame of the trailer supporting vehicle A, the rearward portion 17a of the central longitudinal member is lower than its forward portion 17b. Similarly, the central portion 16a of the transverse frame member 16 is lower than its upper end portions 16b. In view of this relationship, the ball portion 35 of a trailer hitch may be connected to the frame for reception of the usual socket member 36 at the forward end of the trailer frame 21 at a lower elevation than the connection between the spherical socket 12 at the forward hitch with the ball portion 37 of the hitch at the rear of the automobile B.

The point of attachment between the forward portion of the trailer frame 21 and the trailer supporting frame may be varied by locating the ball hitch member 35 in a selected hole of a plurality of longitudinal holes 38 provided in the transverse member 16 and central member 17. As disclosed in the drawings, the spindle 39 of the ball member 35 extends through one of the holes 38, with its flange 40 clamped against the upper surface of the horizontal web 41 of the central longitudinal member 17 by a lock washer 42 and nut 43 threaded on the spindle bearing against the underside of the web 41.

It is apparent that the particular hole 38 in which the hitch ball member 35 is placed determines the proportion of the trailer load to be carried by the auxiliary trailer supporting vehicle A and by the automobile B to which the latter is connected. Manifestly, as the ball member 35 of the trailer hitch is moved forwardly of the frame, the greater is the portion of the load carried by the automobile B as compared to the portion supported and carried by the vehicle A interposed between the trailer C and automobile.

Regardless of the selected hole 38 in which the ball member of the hitch is secured, substantial movement between the trailer frame 21 and the vehicle frame is prevented by the fork clamping member 19. After the ball hitch 35 has been placed in a selected hole 38 and secured in place, the socket 36 at the forward end of the trailer frame 21 may be secured thereto. The clamp members 19 on opposite sides of the rear converging members 18 are then moved inwardly to engage the sides 21 of the trailer frame with the brake lining 20b on their upper and lower jaws 20 and strip 20a engaging the upper, lower and outer surfaces of the convergent side frame members 21 of the trailer itself. The bolts 24 and 21a are then tightened to secure the clamp members 19 in place.

It is evident that the adjustable clamp member arrangement permits a rigid unitary structure to be effected between the trailer vehicle supporting frame and the trailer frame itself, regardless of the longitudinal disposition of the forward portion of the trailer frame with respect to the trailer supporting frame. Accordingly, relative lateral movement between the two frames cannot occur, nor can substantial relative vertical movement occur, because of the engagement between the lining 20b on clamp jaws 20 and the upper and lower sides of the trailer frame 21.

The functionally unitary frame construction just described not only prevents the lateral movement referred to, but the prevention of the relative vertical movement affords a safety feature through preventing dropping of one side of the vehicle supporting frame in the event of deflation of a caster wheel tire. Such deflation would still afford at least a three-point support for the combined frame structure, two points of such support being furnished by the trailer wheels themselves, and the third point of support by the caster wheel on the other side of the trailer supporting frame. Accordingly, the side of the trailer supporting frame on which tire deflation has occurred cannot drop or sag.

The frame of the trailer supporting vehicle is made of a minimum number of parts, which contributes to its strength and rigidity. The various frame members shown in the drawings are made from channel sections, and the forward and rear diagonal members 10, 18 on each side of the vehicle A are preferably integral with each other. Actually, as disclosed in the drawings, the upper and lower flanges 44, 45 of each channel-shaped member are cut away in the region of the vertical bearing boss 13 in such manner as to result in a snug engagement between the flanges 44, 45 and the exterior of the bearing boss 13 when the channel member is bent to cause the proper angular disposition between the forward and rear members 10, 18. The web 46 interconnecting the flanges 44, 45 passes around the outer side of the boss 13, and this web 46, together with the upper and lower flanges 44, 45, is welded to the vertical bearing 13. It is also to be noted that the central longitudinal member 17 and transverse member 16 are disposed with their flanges 47 vertical with the trailer hitch holes 38 extending through their webs 41, 48.

From the foregoing specific description of the trailer supporting vehicle disclosed in the drawings, it is apparent that a conveyance has been provided which is capable of supporting a substantial portion of the trailer load, thereby relieving the towing automobile, or equivalent vehicle, of such load. It is also apparent that the arrangement described permits support and movement of the trailer C while it is disposed substantially parallel to the road, rather than inclined to the plane of the road as would result from a direct connection of the trailer frame to the automobile. The trailer supporting frame is rigidly secured to the trailer frame itself, causing the two to function substantially as a unitary structure, and the forming of several of the trailer supporting frame members integral with one another permits a much more rigid and stronger frame structure to be produced than if all of the parts were separate from one another. Such integral construction also decreases the cost of manufacture of the vehicle.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A wheeled vehicle adapted to couple a tractor and a trailer and to carry a substantial portion of the trailer load, comprising a wheeled support, a frame comprising a cross member mounting said wheeled support and a longitudinal member secured to a medial portion of said cross member and extending forwardly therefrom, said frame being provided with a plurality of spaced, longitudinally aligned holes formed in the longitudinal member, said holes being adapted to receive a demountable trailer coupling member and being so spaced and so located relative to the wheeled support as to provide a substantial variation of proportions of trailer load carried by the vehicle and by the tractor, and a tractor coupling member secured to the forward end of said longitudinal member, said cross member and the rearward portion of said longitudinal member being located at a substantially lower level than the forward portion of said longitudinal member, whereby the point of vehicle-trailer coupling is substantially lower than the point of vehicle-tractor coupling.

2. A wheeled vehicle adapted to couple a tractor and a trailer and to carry a substantial portion of the trailer load, comprising a wheeled support, a frame comprising a cross member mounting said wheeled support and a longitudinal member secured to a medial portion of said cross member and extending forwardly therefrom, said frame being provided with a plurality of spaced, longitudinally aligned holes formed in the longitudinal member, said holes being adapted to receive a demountable trailer coupling member and being so spaced and so located relative to the wheeled support as to provide a substantial variation of proportions of trailer load carried by the vehicle and by the tractor, and a tractor coupling member secured to the forward end of said longitudinal member, said cross member and the rearward portion of said longitudinal member being located at a substantially lower level than the forward portion of said longitudinal member, whereby the point of vehicle-trailer coupling is substantially lower than the point of vehicle-tractor coupling, said vehicle also including rearward members extending diagonally and inwardly from the outer ends of said cross member, each said rearward member being provided with a clamp adapted to clamp the vehicle to a trailer and thereby substantially reduce relative movement between the trailer and vehicle.

3. A trailer supporting vehicle, comprising a frame having a medial line and including a pair of forward members converging forwardly to and spaced symmetrically of said medial line, a cross member secured to the rear of said forward members and bisected by said medial line and a longitudinal member co-axial with said medial line and fixed at its forward end to said forward members and at its rearward end to said cross member, the medial portion of said cross member and the rearward portion of said longitudinal member being disposed in a lower plane than said forward members, a coupling member secured to said forward members and longitudinal member and adapted for attachment to a companion coupling member of an automobile, a pair of road engageable wheels supporting said frame, said frame being formed with spaced holes for receiving a detachable coupling member, said holes being disposed along said medial line in the lower portion of said frame, and a detachable coupling member for seating in said holes and adapted to support the forward end of a trailer.

4. A trailer supporting vehicle, comprising a frame having a medial line and including a pair of forward members converging forwardly to and spaced symmetrically of said medial line, a pair of rearward members secured to said forward members, a cross member secured to the rear of said forward members and bisected by said medial line and a longitudinal member co-axial with said medial line and fixed at its forward end to said forward members and at its rearward end to said cross member, the medial portion of said cross member and the rearward portion of said longitudinal member being disposed in a lower plane than said forward members, a vertical bearing support secured to each forward and rearward member and to an adjoining end of said cross member, means swingably mounted in each bearing support, said means including a road engageable wheel, a first coupling member secured to said forward members and longitudinal member and adapted for attachment to a companion coupling member on an automobile, said frame being formed with spaced holes for receiving a detachable coupling member, said holes being disposed along said medial line in the lower portion of said frame, and a detachable coupling member for seating in said holes and adapted to support the forward end of a trailer.

5. A trailer supporting vehicle, comprising a frame having a medial line and including a pair of forward members converging forwardly to and spaced symmetrically of said medial line, a pair of rearward members secured to said forward members, a cross member secured to the rear of said forward members and bisected by said medial line and a longitudinal member co-axial with said medial line and fixed at its forward end to said forward members and at its rearward end to said cross member, the medial portion of said cross member and the rearward portion of said longitudinal member being disposed in a lower plane than said forward members, a vertical bearing support secured to each forward and rearward member and to an adjoining end of said cross member, means swingably mounted in each bearing support, said means including a road engageable wheel, a first coupling member secured to said forward members and longitudinal member and adapted for attachment to a companion coupling member on an automobile, said frame being formed with spaced holes for receiving a detachable coupling member, said holes being disposed along said medial line in the lower portion of said frame, a detachable coupling member for seating in said holes and adapted to support the forward end of a trailer, and a clamp adjustably secured to each rearward member and adapted to engage and support said trailer.

6. A trailer supporting vehicle as defined in claim 5, said clamp securing means including instrumentalities for adjusting said clamp vertically of said rearward member.

7. A trailer supporting vehicle comprising a pair of spaced wheels, a frame having a medial line and including a cross member bisected by said medial line and a longitudinal member fixed at its rearward end to said cross member and disposed co-axially of said medial line, the central portion of said cross member and the rearward portion of said longitudinal member being disposed at a lower level than the forward end of said longitudinal member, said frame being formed with spaced holes disposed along said medial line and in the lower portion of the frame, a coupling member secured to the forward end of said longitudinal member, and a demountable coupling member secured in one of said holes and being removable from and positionable in each of said holes.

THOMAS R. GARDINER.

REFERENCES CITED

The following references are of record in the file of this patent:

UNITED STATES PATENTS

| Number | Name | Date |
|---|---|---|
| 2,302,246 | Nelson | Nov. 17, 1942 |
| 2,344,921 | McDaniel | Mar. 21, 1944 |
| 2,379,265 | Whitmer | June 26, 1945 |
| 2,381,190 | Tiner et al. | Aug. 7, 1945 |
| 2,385,099 | Nelson | Sept. 18, 1945 |